(12) United States Patent
Ding et al.

(10) Patent No.: US 11,070,098 B2
(45) Date of Patent: Jul. 20, 2021

(54) WIRELESS CHARGER WITH ADAPTIVE ALIGNMENT ASSISTANCE

(71) Applicant: Google LLC, Mountain View, CA (US)

(72) Inventors: Yao Ding, San Jose, CA (US); Hui Li, Shanghai (CN)

(73) Assignee: Google LLC, Mountain View, CA (US)

( * ) Notice: Subject to any disclaimer, the term of this patent is extended or adjusted under 35 U.S.C. 154(b) by 186 days.

(21) Appl. No.: 16/248,931

(22) Filed: Jan. 16, 2019

(65) Prior Publication Data

US 2020/0227954 A1 Jul. 16, 2020

(51) Int. Cl.
- H02J 50/90 (2016.01)
- H02J 7/02 (2016.01)
- H01F 38/14 (2006.01)
- H01F 27/24 (2006.01)
- H02J 50/10 (2016.01)
- H01F 27/36 (2006.01)

(52) U.S. Cl.
CPC ............. *H02J 50/90* (2016.02); *H01F 27/24* (2013.01); *H01F 38/14* (2013.01); *H02J 7/025* (2013.01); *H02J 50/10* (2016.02); *H01F 27/36* (2013.01)

(58) Field of Classification Search
CPC .................................. H02J 7/025; H02J 50/90
USPC ........................................................ 320/108
See application file for complete search history.

(56) References Cited

U.S. PATENT DOCUMENTS

| | | | |
|---|---|---|---|
| 8,098,049 B2 * | 1/2012 | Morris | H02J 7/025 320/137 |
| 9,711,272 B2 | 7/2017 | Hassan-Ali et al. | |
| 2009/0289595 A1 | 11/2009 | Chen et al. | |
| 2011/0074342 A1 | 3/2011 | MacLaughlin | |
| 2016/0094051 A1 | 3/2016 | Soar | |
| 2016/0181857 A1 | 6/2016 | Konanur et al. | |
| 2016/0322847 A1 | 11/2016 | Geiszler | |
| 2016/0341573 A1 | 11/2016 | Widmer et al. | |
| 2017/0094392 A1 | 3/2017 | Zorkendorfer et al. | |
| 2017/0288448 A1 * | 10/2017 | Kranz | H02J 50/12 |

(Continued)

FOREIGN PATENT DOCUMENTS

| | | |
|---|---|---|
| CN | 201393091 Y | 1/2010 |
| CN | 207835164 U | 9/2018 |
| KR | 20130000358 U | 1/2013 |

OTHER PUBLICATIONS

'wikipedia.org' [online] "Inductive charging," Last Updated: Jan. 10, 2019,[retrieved on Jan. 10, 2019] Retrieved from Internet: URL< https://en.wikipedia.org/wiki/Inductive_charging> 10 pages.

(Continued)

*Primary Examiner* — Edward Tso
*Assistant Examiner* — Ahmed H Omar
(74) *Attorney, Agent, or Firm* — Fish & Richardson P.C.

(57) ABSTRACT

In some implementations, a wireless charger includes a power transmission coil, a magnet sensor, an electromagnet, and control circuitry. The power transmission coil can wirelessly provide power at a charging area of the wireless charger through inductive coupling. The magnet sensor is arranged to detect the presence of a magnet at the charging area. The electromagnet can generate a magnetic field in the charging area when the electromagnet is energized. The control circuitry is able to selectively energize the electromagnet based on signals generated using the magnet sensor.

17 Claims, 8 Drawing Sheets

(56) References Cited

U.S. PATENT DOCUMENTS

| | | |
|---|---|---|
| 2017/0347182 A1 | 11/2017 | Chawan et al. |
| 2017/0353821 A1 | 12/2017 | Evans et al. |
| 2018/0370376 A1* | 12/2018 | Liu ......................... B60L 53/38 |
| 2019/0006893 A1* | 1/2019 | Shaw ...................... H02J 50/12 |

OTHER PUBLICATIONS

'wikipedia.org' [online] "Qi (Standard)," Last Updated: Dec. 26, 2018 [retrieved on Jan. 10, 2019] Retrieved from Internet: URL< https://en.wikipedia.org/wiki/Qi_(standard)> 6 pages.

'wikipedia.org' [online] "Wireless power transfer," Last Updated: Jan. 8, 2019, [retrieved on Jan. 10, 2019] Retrieved from Internet: URL< https://en.wikipedia.org/wiki/Wireless_power_transfer> 17 pages.

'www.bgr.com' [online] "You can already charge your iPhone and Apple Watch at the same time with this $35 wireless charging pad," Maren Estrada, Aug. 22, 2018 [retrieved on Jan. 10, 2019] Retrieved from Internet: URL< https://bgr.com/2018/08/22/apple-watch-wireless-charger-and-iphone-dual-charger/> 14 pages.

'www.imore.com' [online] "Best Stands to Charge Both iPhone and Apple Watch," Luke Filipoqicz, Last Updated Sep. 26, 2018, [retrieved on Jan. 10, 2018] Retrieved from Internet: URL< https://www.imore.com/these-stands-are-perfect-if-you-own-apple-watch-and-iphone> 5 pages.

* cited by examiner

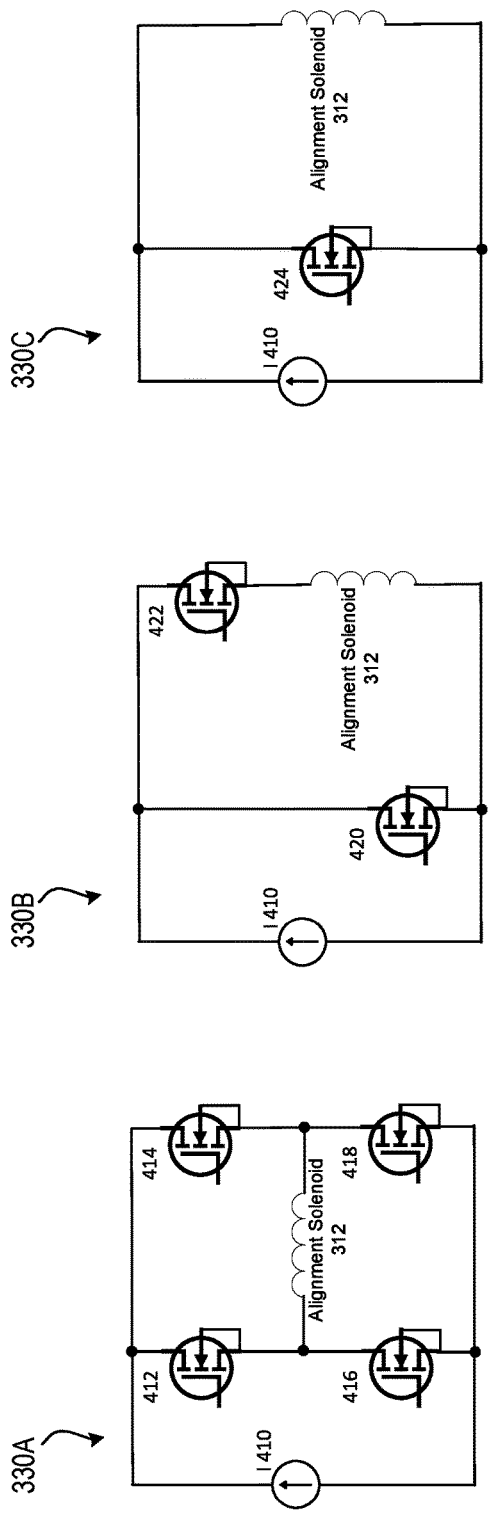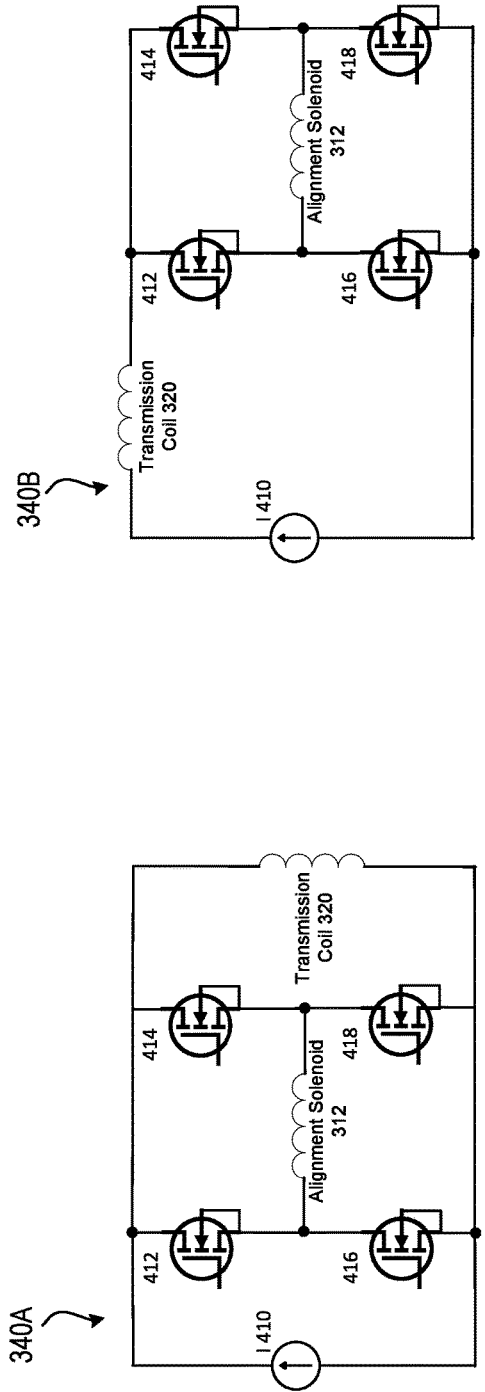
FIG. 4C
FIG. 4E
FIG. 4B
FIG. 4A
FIG. 4D

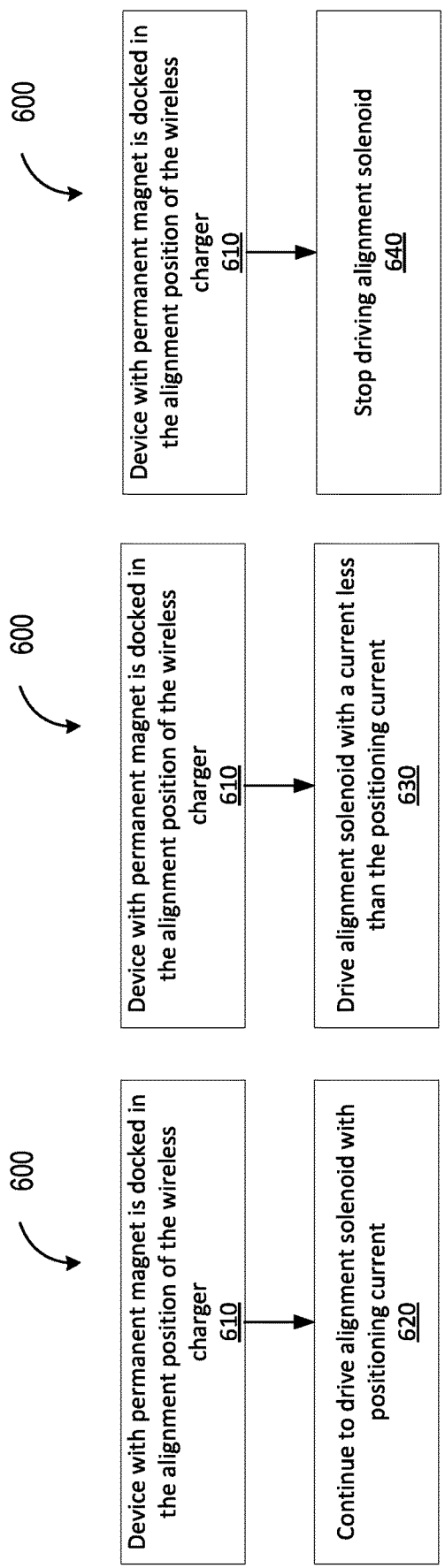

WIRELESS CHARGER WITH ADAPTIVE ALIGNMENT ASSISTANCE

TECHNICAL FIELD

This description relates to wireless chargers providing adaptive alignment assistance.

BACKGROUND

Wireless chargers can transmit power to mobile devices, such as mobile phones and other battery-powered devices. For example, wireless chargers may transmit energy from a transmission coil that inductively couples with a receiving coil of a device to be charged. Typically, to achieve high efficiency, the device to be charged should be positioned so that the receiving coil is spatially aligned with the position of the transmission coil of the charger.

SUMMARY

In some implementations, a wireless charger selectively provides magnetic assistance to guide certain devices into alignment with respect to the wireless charger, while not providing magnetic assistance to other types of devices. For example, the wireless charger may be configured to automatically detect the type of device placed on the charger, and then to adaptively engage magnetic assistance only when appropriate for the detected type of device.

One application is a wireless charger that can charge devices with relatively large receiving coils, such as phones, as well as devices with much smaller receiving coils, such as watches, earbuds, or other wearables. Phones often do not include alignment magnets. As a result, when the wireless charger detects that a phone is present, or at least that no alignment magnet is in the charging area, the wireless charger performs charging without engaging magnetic positioning assistance. On the other hand, many smartwatches include one or more magnets to assist with aligning to a charger. When the wireless charger detects the presence of a watch in the charging area, for example, by detecting the presence of a magnet in the charging area, the wireless charger energizes one or more electromagnets in the wireless charger to attract the magnet of the watch to the correct alignment for charging. This allows the wireless charger to be used effectively and with high efficiency for many types of devices.

Wireless charging is becoming increasingly popular in consumer electronics, with many devices supporting charging according to the QI charging standard or other standards. For smartphone charging, both the phone and the charger have relatively flat surfaces, and the coupling between the transmission coil in the charger and the receiving coil in the phone is often very good. The receiving coil size is also relatively large, which allows enough positioning tolerance in three dimensions, e.g., X, Y, and Z, for a user to manually align the phone on the charger without assistance. In most cases, highly accurate alignment of a phone with respect to a charger is not mandatory to achieve acceptable power transfer efficiency.

For a smartwatch, on the other hand, the power receiving coil is usually quite small, which significantly limits the range of positions that can achieve high charging efficiency. Further complicating placement is the fact that many watches often have a metal case or exterior very near or around the power receiving coil. For smartwatch charging, accurate alignment of transmitting and receiving coils is essential during charging. To assist with alignment, an alignment magnet is typically included in the smartwatch, for example, at the center of the power receiving coil. The alignment magnet can be attracted or be guided into the correct placement by a corresponding magnet in the wireless charger.

Although it is desirable to have a magnet in a charger for small devices, such as smart watches, it is not desirable to include a magnet in chargers for phones and other larger devices, because the presence of magnets can reduce charging efficiency. When a permanent magnet is in the charging area, some of the charging energy is dissipated in resisting the magnetic fields produced by the permanent magnet.

As discussed further below, wireless chargers can use an electromagnet, such as a solenoid, to selectively provide magnetic alignment assistance. The electromagnet is energized when needed to achieve proper alignment (e.g., for charging watches), but the electromagnet is not energized when magnetic alignment assistance is not needed (e.g., for charging phones). In this manner, high efficiency is obtained for charging phones, while precise alignment is still available for charging watches. The timing and amount of magnetic fields provided by the electromagnet can be varied also, to provide effective placement and power efficiency. For example, the electromagnet may be fully energized briefly as charging is initiated, e.g., for a few seconds, to bring a watch into alignment. Once the proper alignment is achieved, the power to the electromagnet can be decreased or terminated, thus limiting power expended in the electromagnet and also reducing the magnitude of magnetic fields that may resist the fields of the transmission coil.

The wireless charger can use a magnetic sensor to detect the presence of a watch or other device having an alignment magnet. For example, an electromagnet can be placed with an adjacent magnetic sensor, such as a Hall effect sensor. The magnetic sensor can also determine the polarity of a magnet in a devices, allowing the charger to energize the electromagnet with the opposite polarity to attract the smartwatch into an optimal alignment.

In addition to detecting devices using the magnetic sensor, the wireless charger can use other forms of communication to detect or verify the device type of a device placed on the wireless charger. For example, the charger may communicate with the device to be charged through the inductive coupling of the transmitting and receiving power coils. For example, using the QI standard, control packets can be sent as the receiving varies the impedance of the receiving coil while inductively coupled to the transmitting coil. The device can thus provide information indicating its device type through this channel. In some implementations, other forms of communication, such as Bluetooth, may be similarly used to communicate device types or device characteristics.

The techniques described herein can be implemented to achieve one or more of the following improvements and advantages. For example, a charger that selectively engages magnetic alignment assistance provides improved versatility, allowing to charge several different device types with a single charger. The wireless charger can act as a universal charger for devices with different sizes of receiving coils and alignment mechanisms. In addition, by including magnetic assistance, the efficiency of charging can be increased, especially for devices with small receiving coils where proper alignment is often very important.

In addition, by using one or more electromagnets rather than permanent magnets, the efficiency of charging is further increased. Permanent magnets oppose the varying magnetic fields produced during charging and incur power losses, as well as generate heat during inductive charging. By contrast, an iron or ferrite core of an electromagnet has much lower magnetic coercivity than a permanent magnet, and so does not resist the magnetic fields as a permanent magnet would, thus resulting in less power loss and lower heat generation than permanent magnets. Using one or more electromagnets, a charger can achieve charging of some devices without the efficiency loss of a magnet present, while retaining the ability to use a magnet to charge other devices.

The magnetic sensor can also provide a number of advantages, including the ability to detect the presence of a device that has alignment magnets. The charger can use signals from the magnetic sensor to trigger magnetic alignment assistance. Beyond simply detecting the presence of a device that would benefit from magnetic positioning assistance, the magnetic sensor can be used to detect the polarity of alignment magnets so that the electromagnet can be energized to produce the opposite magnetic polarity, thus causing an attractive force on the device being charged. In this manner, the polarity of the alignment magnets in a device to be charged does not need to be known in advance by the charger, since the charger can appropriately energize the electromagnet to provide an attractive force for whichever polarity of alignment magnet is present in a device.

In one aspect a wireless charger includes: a power transmission coil configured to wirelessly provide power at a charging area of the wireless charger through inductive coupling; a magnetic sensor arranged to detect the presence of a magnet at the charging area; an electromagnet configured to generate a magnetic field in the charging area when the electromagnet is energized; and control circuitry configured to selectively energize the electromagnet based on signals generated using the magnetic sensor.

In some implementations, the magnetic sensor is a Hall effect sensor.

In some implementations, the electromagnet is a solenoid.

In some implementations, the solenoid has a core formed of iron, ferrite, or a powdered iron material.

In some implementations, the charging area is a substantially planar surface of the wireless charger, where the solenoid has a core that extends along an axis, the axis being oriented substantially perpendicular to the substantially planar surface, the solenoid having one or more coils that extend around the core about the axis.

In some implementations, the control circuitry is configured to maintain the electromagnet deactivated when a device of a first device type is placed in the charging area; and the control circuitry is configured to activate the electromagnet when a device of a second device type of placed in the charging area In some implementations, the first device type is a mobile phone device type, and the second device type is a watch device type.

In some implementations, the control circuitry is configured to determine, upon placement of a device in the charging area, whether the device is one of multiple device types; and the control circuitry is configured to selectively activate the electromagnet depending on the device type determined for the device.

In some implementations, the electromagnet is located along the charging area and configured to attract, when energized, a magnet of a device on the charging area, the control circuitry being configured to initiate activation of the electromagnet in response to detecting the magnet of the device using the magnetic sensor.

In some implementations, the electromagnet has a core, and the magnetic sensor is located adjacent to the core of the electromagnet such that the magnetic sensor is configured to sense magnetic fields transmitted through the core of the electromagnet.

In some implementations, the charging area includes a substantially planar external surface of the wireless charger configured to support a device during charging of the device; where the magnetic sensor is a Hall effect sensor; where the electromagnet is a solenoid, the solenoid having a core extending along an axis from a first end of the core to a second end of the core; and where the core of the solenoid is arranged such that the axis is substantially perpendicular to the substantially planar external surface, the first end of the core facing the substantially planar external surface, and the Hall effect sensor being disposed at the second end of the core.

In some implementations, the control circuitry is configured to determine a device type for a device located at the charging area based on wireless communication with the device; and the control circuitry is configured to selectively energize the electromagnet based on the device type determined through wireless communication with the device.

In some implementations, the magnetic sensor is configured to detect a polarity of a magnet of a device placed on the charging area; and the control circuitry configured to energize the electromagnet with a polarity opposite the detected polarity of the magnet of the device, such that the energized electromagnet attracts the magnet of the device toward an alignment position for charging the device with the wireless charger.

In some implementations, the control circuitry is configured to energize the electromagnet with a first level of current in response to signals from the magnetic sensor that detect the presence of a magnet at the charging area; and the control circuitry is configured to reduce the current through the electromagnet from the first level of current after the first level of current has been applied for a predetermined amount of time or after a device has reached an alignment position with respect to the charging area.

In one aspect a method includes: determining, by a wireless charger, a device type for a device to be charged at a charging area of the wireless charger; based on the device type, selecting an operating mode from among (i) a first operating mode that energizes an electromagnet of the wireless charger to guide alignment of the device with respect to the wireless charger, and (ii) a second operating mode that does not energize the electromagnet of the wireless charger; and initiating wireless charging of the device using the selected operating mode.

In some implementations, determining the device type includes using a magnetic sensor of the wireless charger to determine whether a magnet is present at a charging area of the wireless charger.

In some implementations, determining whether a magnet is present includes detecting a magnet of the device in the charging area; where selecting the operating mode includes selecting the first operating mode; and where initiating wireless charging includes energizing the electromagnet to attract the magnet of the device on the charging area to guide the device toward an alignment position with respect to the wireless charger.

In some implementations, the method includes detecting a polarity of the magnet of the device to be charged using the magnetic sensor, and selecting, based on the detected polarity of the magnet of the device, from among multiple directions for driving current through the electromagnet; and where energizing the electromagnet includes energizing the magnet with the selected direction for driving current through the electromagnet to cause the electromagnet to attract the magnet of the device.

In some implementations, determining whether a magnet is present includes detecting a magnet is not present in the charging area; selecting the operating mode includes selecting the second operating mode; and initiating wireless charging includes charging the device without energizing the electromagnet.

In one aspect, one or more non-transitory machine-readable media storing instructions that, when executed by one or more processors, cause the one or more processors to perform operations including: determining, by a wireless charger, a device type for a device to be charged at a charging area of the wireless charger; based on the device type, selecting an operating mode from among (i) a first operating mode that energizes an electromagnet of the wireless charger to guide alignment of the device with respect to the wireless charger, and (ii) a second operating mode that does not energize the electromagnet of the wireless charger; and initiating wireless charging of the device using the selected operating mode.

Other embodiments of these and other aspects disclosed in the application include methods, systems, and apparatus, including computer-readable media storing software instructions that configure one or more computers to perform the functions disclosed herein.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4A-4E are example circuit diagrams showing driving circuits of the wireless charging system.

FIGS. 6A-6C are flow diagrams that illustrate example processes that a wireless charger may perform after a mobile device has been appropriately aligned.

Like reference numbers and designations in the various drawings indicate like elements.

DETAILED DESCRIPTION

Figure 1:
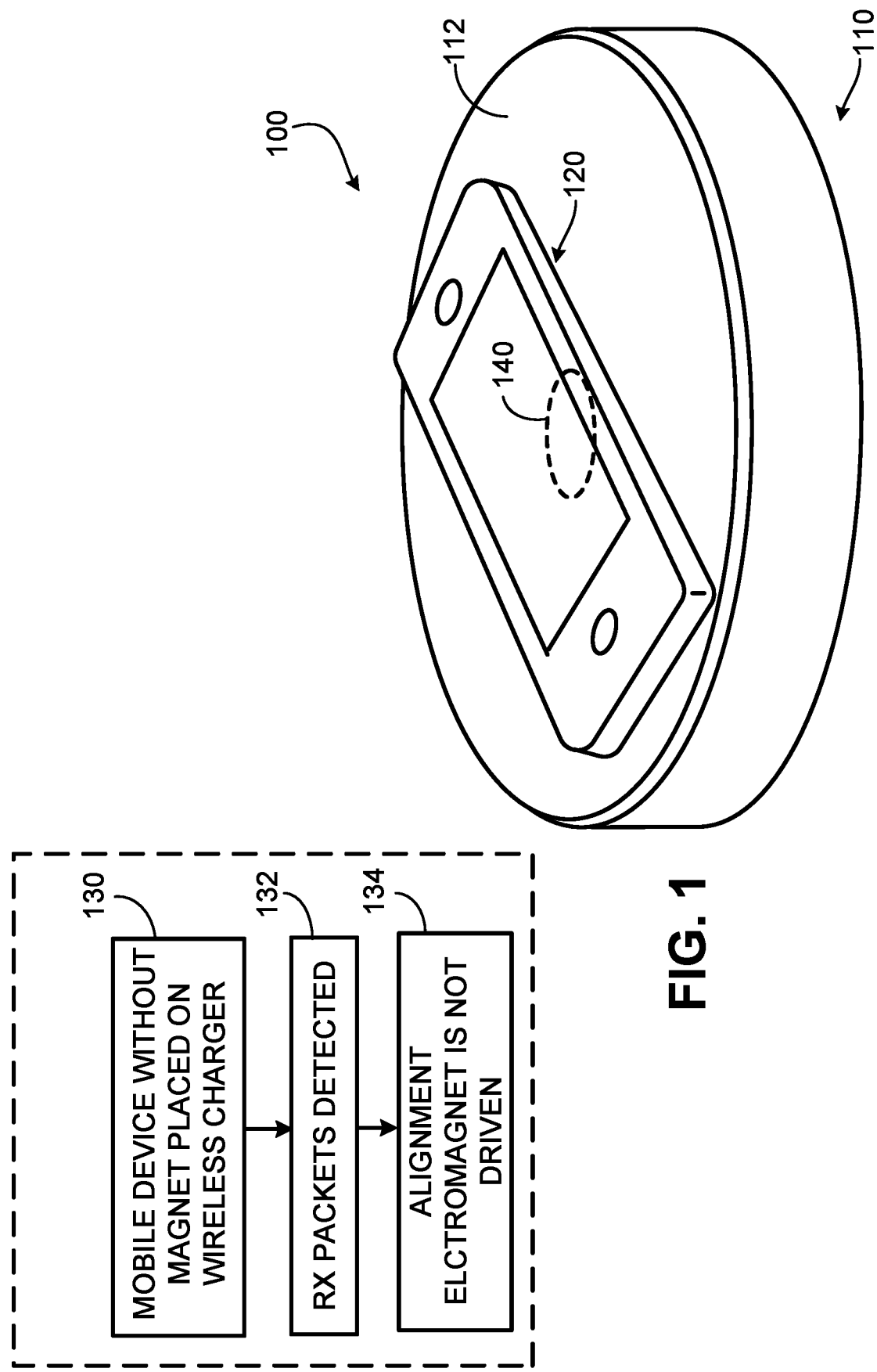
FIG. 1 is an example diagram of a wireless charging system with adaptive alignment assistance.

FIG. 1 is a diagram that illustrates an example of a system 100 for wirelessly charging a mobile device through inductive coupling. The system 100 includes a wireless charger 110 and a mobile device 120.

Figure 2A:
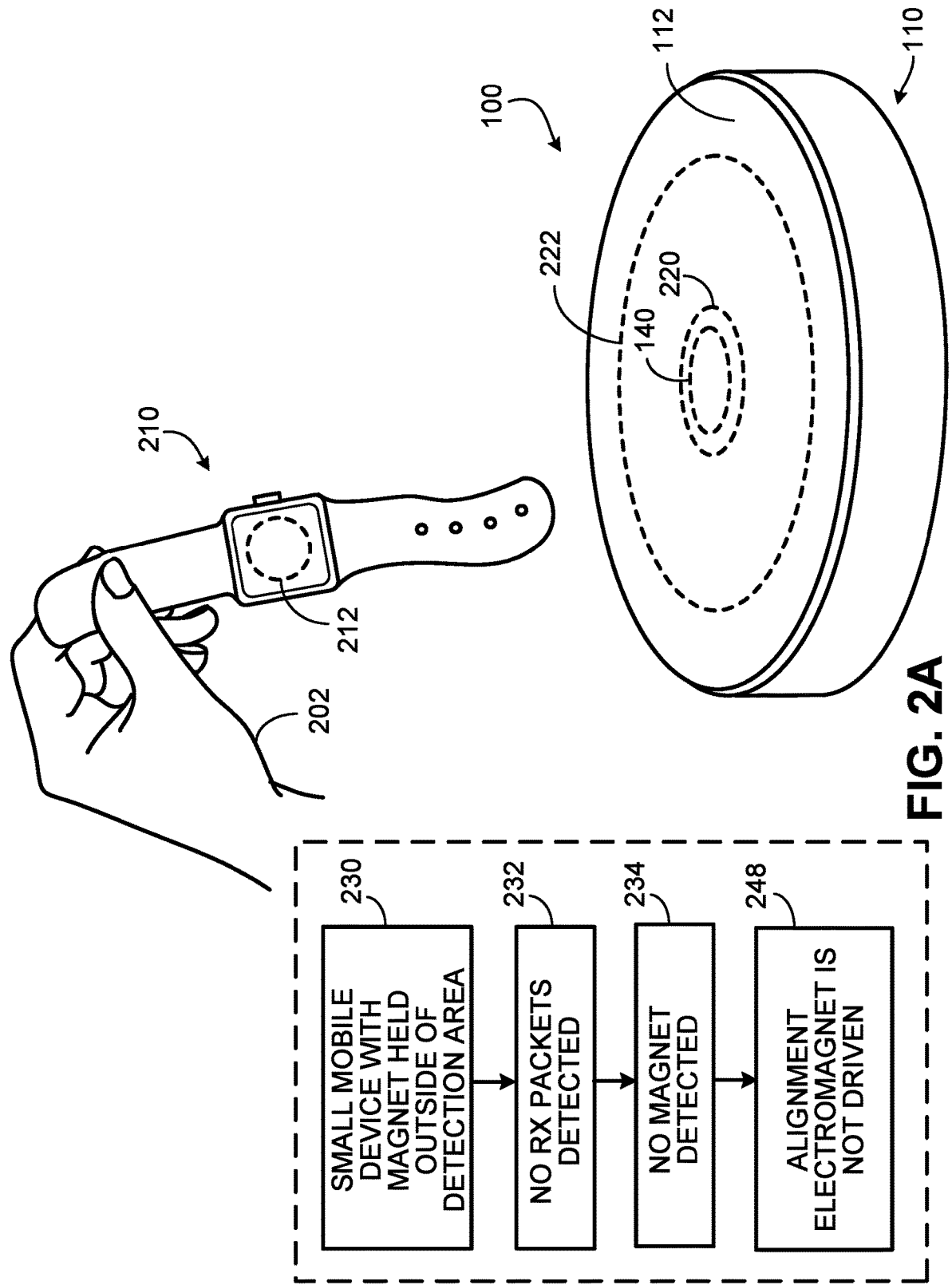
FIGS. 2A-2B are example diagrams of the wireless charging system.
Figure 2B:
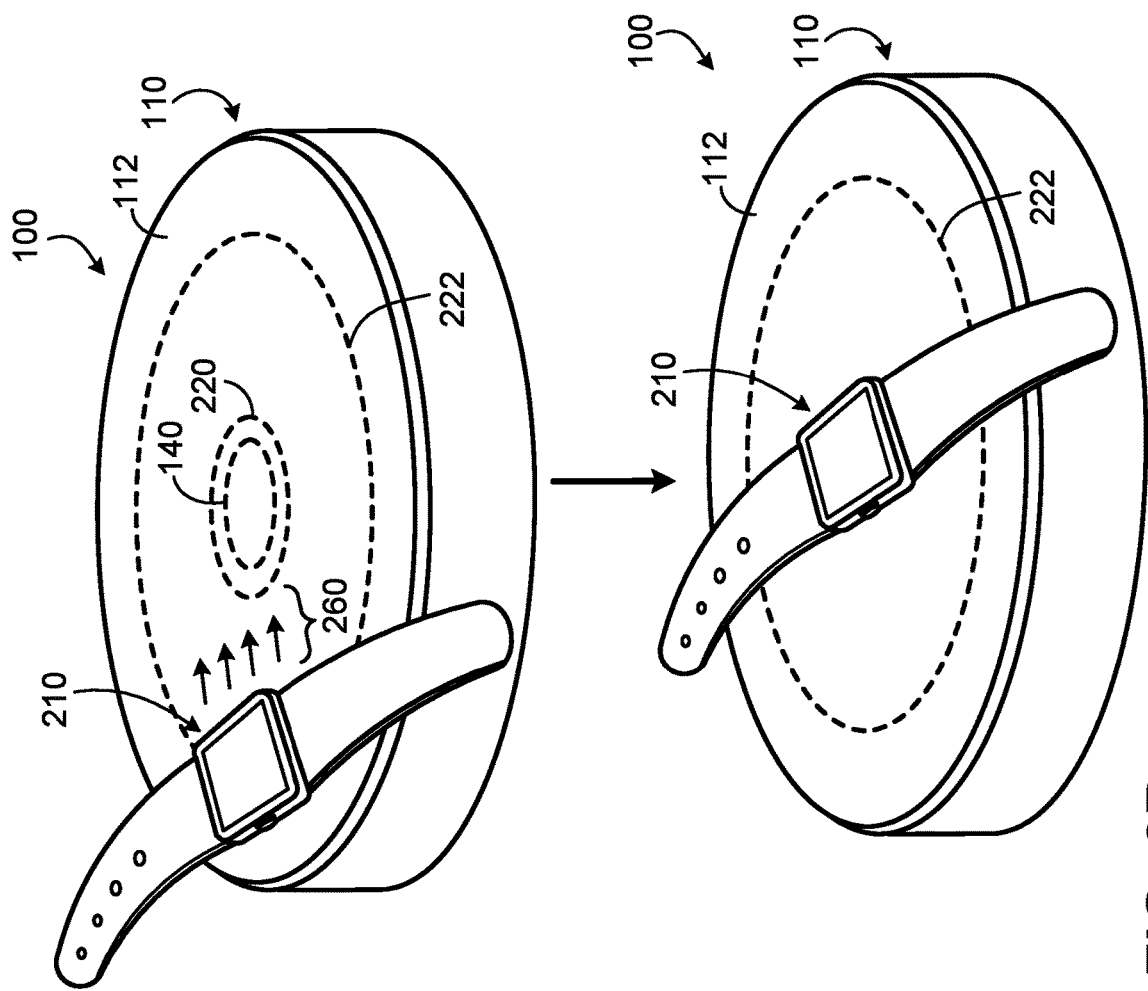

The wireless charger 110 is configured to operate in different modes to charge different types of devices. The wireless charger 110 has an electromagnet 140 that can be used to attract a device with corresponding alignment magnets into the proper alignment for charging. Electromagnet 140 may be a solenoid (e.g., alignment solenoid 312 as shown in FIGS. 3A-4C). However, electromagnet 140 is not activated or energized for charging all devices. For some devices, such as phones and other devices with relative large receiving coils, the wireless charger 110 does not energize the electromagnet 140. For other devices, such as watches and other devices with smaller receiving coils, the wireless charger 110 does energize the electromagnet 140. FIG. 1 shows an example in which the wireless charger 110 charges a mobile device 120 while maintaining the electromagnet 140 deactivated. FIGS. 2A-2B show an example in which the wireless charger 110 energizes the electromagnet 140 to guide a mobile device 210 into an alignment position 220.

Figure 3A:
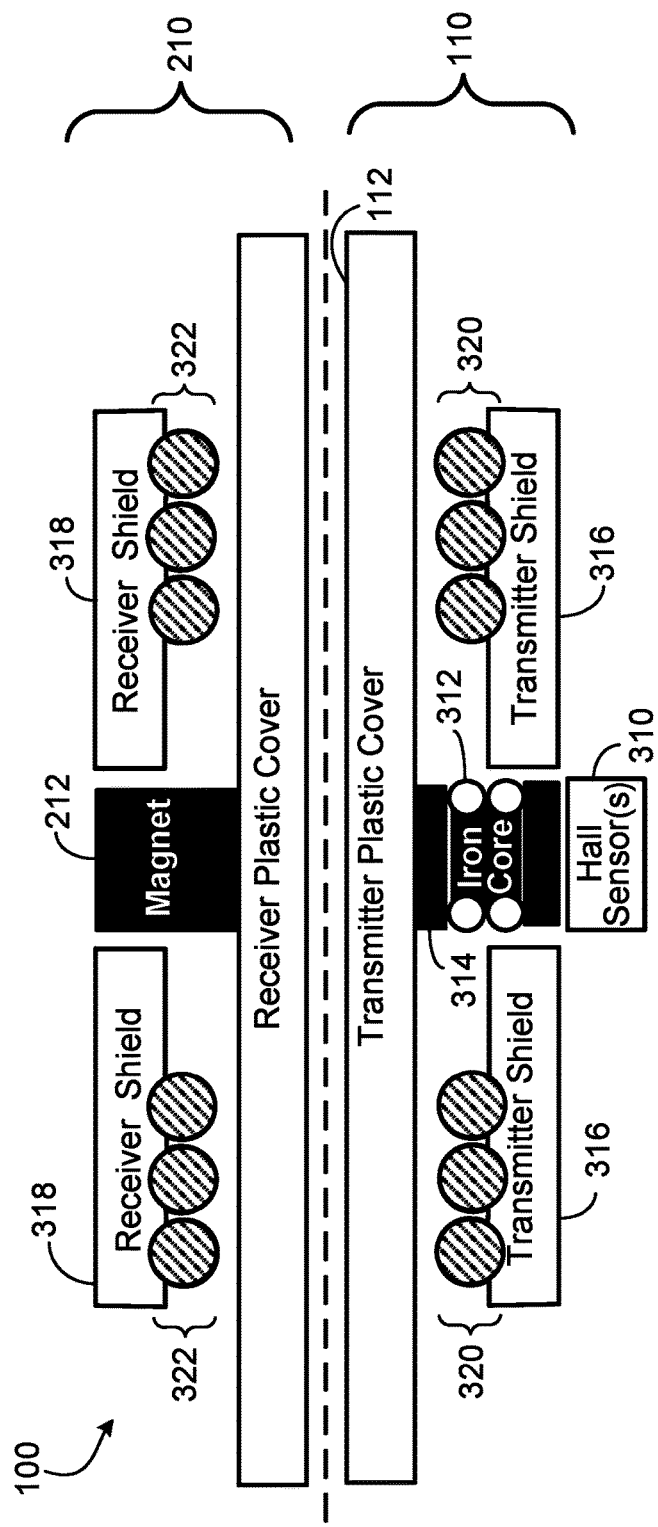
FIG. 3A is an example cutaway diagram of the wireless charging system.

Referring to FIG. 1, the mobile device 120 has a receiver that includes a receiving coil, and magnetic shielding (such as, for example, shield 318 as shown in FIG. 3A). During charging, magnetic fields produced by a transmitting coil in the wireless charger 110 create alternating current (AC) in the receiving coil, thus causing power transfer from the wireless charger 110 to the mobile device 120. The receiver can include a rectifier circuit and a voltage regulation circuit to convert the received AC signal to a direct current (DC) output. In some implementations, the wireless charger 110 may include more than one transmission coil. In some implementations, the wireless charger 110 includes two transmission coil, where a first transmission coil is larger than a second transmission coil.

Mobile device 120 can be any of a number of different types of electronic devices, e.g., a mobile phone, a smart phone, a personal digital assistant (PDA), a music player, an e-book reader, a tablet computer, or a laptop computer. In the example of FIG. 1, the mobile device 120 has a receiving coil that is sufficiently large that rough alignment may achieve acceptable coupling for efficient power transfer. For example, the sizes of the transmitting coil and receiving coil may allow for lateral positioning tolerance of +/−0.5 cm or +/− 1 cm. The mobile device 120 in the example also does not include an alignment magnet. In some implementations, the mobile device 120 has a substantially planar charging surface (e.g., the back of a smart phone).

In use, a user places the mobile device 120 of system 100 on the wireless charger 110 in a charging orientation (e.g., with a screen side facing up for a typical smart, non-flip phone) to enable the inductive charging of the mobile device 120. The wireless charger 110 can have a charging area to receive devices to be charged. This charging area can include a substantially planar charging surface 112. The transmitter produces an AC signal across the transmission coil, which produces an oscillating magnetic field. This magnetic field creates an AC signal in the receiving coil of the mobile device, resulting in the transmitter of the wireless charger 110 and the receiver of the mobile device being magnetically coupled.

In the example of FIG. 1, a mobile device 120 is placed on the flat charging surface 112 of the wireless charger 110 (Step 130). When this occurs, the transmitter of the wireless charger 110 may receive communication packets (e.g., Qi packets) from the receiver of the mobile device 120 (Step 132). Because the mobile device 120 contains a relatively large receiving coil and the mobile device 120 has a flat surface to complement the flat charging surface 112 of the charger, there is sufficient X, Y, and Z tolerance on the placement even when the mobile device 120 is not perfectly aligned with the wireless charger 110. As long as the position of the mobile device 120 is within the tolerance of the system, highly accurate alignment of the mobile device 120 on the flat charging surface 112 of the wireless charger 110 is not mandatory in order to facilitate inductive charging of the mobile device 120.

In general, ideal alignment occurs when the center axis of the receiving coil of the mobile device matches the center axis of the transmission coil of the wireless charger 110. When there is sufficient, X, Y, and Z tolerance, magnetic coupling occurs and power will begin to transfer from the wireless charger 110 to the mobile device 120. After magnetic coupling occurs and power transfer begins, the receiver of the mobile device 120 is able to communicate with the transmitter of wireless charger 110 by means of communication packets (e.g., Qi packets) through the same magnetic coupling path as used for power transmission. As shown in FIG. 1, where communication packets from the receiver of the mobile device 120 are detected, the electromagnet 140 is not driven (Step 134).

In some implementations, the wireless charger 110 uses the detection of one or more communication packets (e.g., a Qi packets) to determine whether the electromagnet 140 will be driven. For example, if the device is a type that uses magnetic positioning assistance, it likely has a relatively small receiving coil. As such, unless the device is accurately positioned initially, it is unlikely that any communication packets will be detected and the wireless charger 110 may drive the electromagnet 140. However, if the device is accurately positioned initially, communication packets are likely to be detected and there also would be no need for the wireless charger 110 to drive the electromagnet 140. Similarly, if the device is a type that does not use magnetic positioning assistance, it likely has a relatively large receiving coil. As such, communication packets would likely be detected when the device is placed on the charging surface 112 whether or not it is accurately positioned and the wireless charger 110 may determine to not energize the electromagnet 140. In addition, or as an alternative, the wireless charger 110 may use a signal strength packet, indicating sufficient signal strength for power transfer, from the receiver of the mobile device 120 to determine whether to energize the electromagnet 140. Similarly, data indicating the amount of power of the mobile device 120 receives can be used to determine the overall coupling efficiency between the mobile device 120 and the wireless charger 110. When the coupling efficiency reaches a predetermined threshold, the wireless charger 110 may determine that the electromagnet 140 will not be driven, since an appropriate level of efficiency or an appropriate magnitude of power transfer has already been achieved. The predetermined threshold may be set, for example, at a percentage between and including 40%-90%.

As will be discussed in more detail below, the determination of whether the wireless charger 110 should energize electromagnet 140 (e.g., alignment solenoid 312 as shown in FIG. 3) may be based on whether a permanent magnet of the mobile device is detected. For example, the wireless charger 110 can be configured so that if no communication packet is received, or if a communication packet indicates a device type that uses magnetic positioning, and/or the wireless charger 110 detects a magnet of the mobile device (e.g., a permanent magnet), the wireless charger 110 may energize the electromagnet 140 so as to draw the mobile device towards an alignment position (e.g., alignment position 220 as shown in FIGS. 2A-2B). In some implementations, it is determined that the mobile device is a device type that uses magnetic positioning, the wireless charger 110 can be configured so that if communication packets are detected, then the wireless charger 110 may energize the electromagnet 140 so as to ensure positive latching between the mobile device and the wireless charger 110. In some implementations, the wireless charger 110 determines whether to energize the electromagnet 140 solely by the detection of a permanent magnet of the mobile device, such that if the wireless charger 110 detects a permanent magnet of the mobile device in the charging area, then the electromagnet 140 will be driven.

Figure 2B:
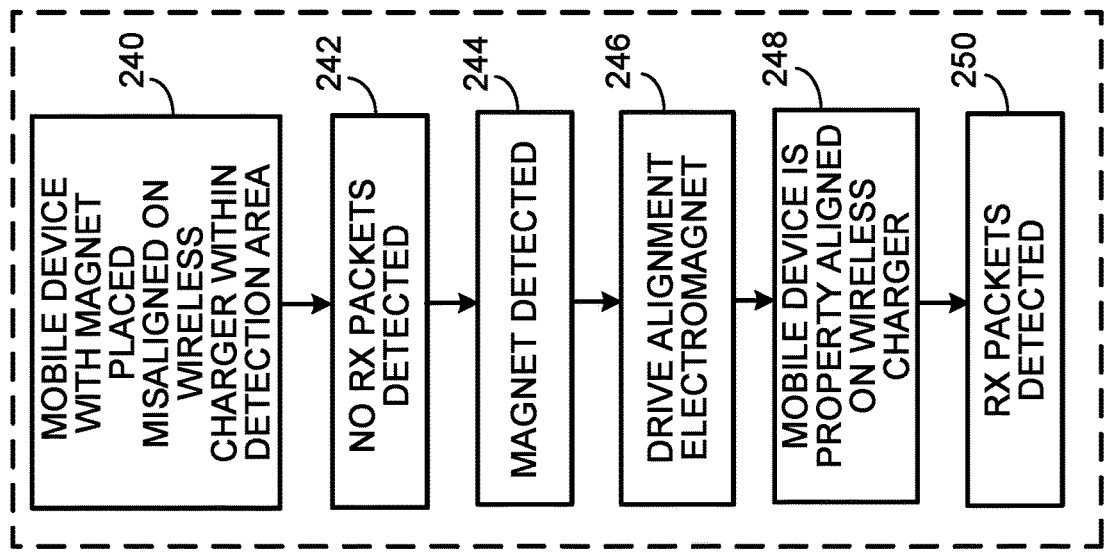

In some implementations, the wireless charger 110 may communicate with the mobile device 120 via Bluetooth. For example, if a Bluetooth connection is established and, based on this connection, the wireless charger 110 determines that the mobile device is of a type that does not use magnetic positioning, then the wireless charger 110 does not energize the electromagnet 140. On the other hand, if a Bluetooth connection is established and, based on this connection, the wireless charger 110 determines that the mobile device is of a type that uses magnetic positioning (such as mobile device 210 as shown in FIGS. 2-3), then the wireless charger 110 may energize the electromagnet 140. In such a case, before the electromagnet 140 is driven, the wireless charger 110 may first wait to detect a permanent magnet of the wearable device (such as mobile device 210 as shown in FIGS. 2-3).

FIGS. 2A-2B are diagrams that illustrates an example of the system 100 for wirelessly charging a mobile device through inductive coupling. The system 100 includes a wireless charger 110 and a mobile device 210. In the example of FIGS. 2A-2B, unlike the example of FIG. 1, the device placed on the wireless charger 110 has an alignment magnet and has a receiving coil small enough to benefit from magnetic positioning assistance. In the example, the wireless charger 110 detects the presence of the magnet of the mobile device 210 and energizes the electromagnet 140 in the wireless charger 110 in response. This attracts the mobile device 210 into an alignment position with respect to the wireless charger 110.

Mobile device 210 is illustrated as a smartwatch. The mobile device 210 can be any of a number of other different devices, which may be wearable or non-wearable, such as a fitness tracker, a head-mounted display (e.g., Google Glass, Daydream Standalone VR, Oculus Rift, etc.), wireless headphones (e.g., wireless earbuds or another headset), or smart jewelry. As shown, the mobile device 210 can include a device alignment magnet 212, which is typically placed at the center of the receiving coil for power transfer. Device alignment magnet 212 can be a permanent magnet.

As shown in FIGS. 2A-2B, the wireless charger 110 includes a wearable device alignment position 220 as defined by the dashed line. Due to the relatively small receiving coil of a wearable device (such as mobile device 210) and potential other factors (e.g., metal casing of the wearable device being in close proximity to the device's receiving coil), accurate alignment between the wearable device and the wireless charger 110 is necessary to achieve strong enough magnetic coupling for high efficiency of power transfer. Therefore, it is desirable to move the mobile device 210 into the alignment position 220 to enable wireless charging of the mobile device 210.

As shown in FIGS. 2A-2B, the wireless charger 110 is configured to detect magnets that are placed in a certain area, shown as a magnet detection area 222 defined by the dashed line. The wireless charger 110 has one or more magnetic sensors, e.g., one or more Hall effect sensors of the wireless charger 110, that are arranged to detect a magnet of the mobile device that is placed over the magnet detection area 222. In some implementations, the one or more Hall effect sensors are threshold Hall effect sensors, such that the sensors produces an output (or change in output) only when the magnetic flux density around the sensors exceeds a certain pre-set threshold. This output or change in output of the one or more Hall effect sensors corresponds with the detection of a magnet. Although a magnet detection area 222 is shown for clarity in illustration, the actual area in which a given magnet is detected may vary depending on the size and type of magnet incorporated in the wearable device, depending on the sensitivity of the one or more Hall effect sensors, and depending on the set threshold detection level. A Hall effect sensor may be chosen and/or the threshold detection level is set so that when the mobile device 210 is placed within the magnet detection area 222 and when the electromagnet 140 is driven, the magnetic field produced by the electromagnet 140 is sufficient to pull the mobile device 210 into the alignment position 220.

In the example of FIG. 2A, a user 202 is holding the mobile device 210 outside of the magnet detection area 222 (Step 230). Due to the relatively small receiving coil of the mobile device 210 and due to the mobile device 210 not being accurately aligned with the wireless charger 110 (i.e. not in alignment position 220), the transmitter of the wireless charger 110 does not detect any communication packets from the receiver of the mobile device 210 (step 232). At step 232, because no communication packets are detected, there is yet to be a determination as to whether the electromagnet 140 should be driven. As discussed above, in some implementations, had communications packets been detected, a determination of whether to drive or not to drive the electromagnet 140 would occur. Furthermore, because the mobile device 210 is outside of the magnet detection area 222, the one or more Hall effect sensors of the wireless charger 110 do not detect the device alignment magnet 212 of the mobile device 210 (step 234). Despite no communication packets being detected, because no permanent magnet is detected, electromagnet 140 is not driven (step 236).

As discussed in some detail above, in some implementations, even where communication packets are detected (or sought communication packets are detected), the electromagnet 140 may be driven solely due to the Hall effect sensor(s) of the wireless charger 110 detecting a permanent magnet of the mobile device (such as device alignment magnet 212 of the mobile device 210).

In the example of FIG. 2B, the mobile device 210 has been placed misaligned on the wireless charger 110 (step 240). Due, in part, to the relatively small receiving coil of the mobile device 210 and due to the mobile device 210 not being accurately aligned with the wireless charger 110 (i.e. not in alignment position 220), the transmitter of the wireless charger 110 does not detect any communication packets from the receiver of the mobile device 210 (step 242). At step 242, because no communication packets are detected, there is yet to be a determination as to whether the electromagnet 140 should be driven. As discussed above, in some implementations, if communications packets were detected, a determination not to drive the electromagnet 140 would occur. In other implementations, step 242 is replaced with a step where the wireless charger 110 detects communication packets indicating a device type that uses magnetic positioning. In yet other implementations, step 242 is replaced with a step where the wireless charger 110 detects communication packets indicating a weak signal strength between the transmitter and the receiver. In yet other implementations, step 242 is replaced with a step where the wireless charger 110 detects communication packets indicating a low coupling efficiency between the transmitter and the receiver. However, because the mobile device 210 is within the magnet detection area 222, the Hall effect sensor(s) of the wireless charger 110 detect(s) the device alignment magnet 212 of the mobile device 210 (step 244). Because no communication packets are detected and because device alignment magnet 212 is detected, the electromagnet 140 is driven (step 246), resulting in a magnetic force 260 applied to the device alignment magnet 212 in a direction towards the alignment position 220. As shown, the magnetic force 260 drags the mobile device 210 into the alignment position 220 (step 248). When the mobile device 210 is located in alignment position 220, the center axis of the receiving coil of the mobile device 210 is accurately aligned with the center axis of the transmission coil of the wireless charger 110, and magnetic coupling between the wireless charger 110 and the mobile device 210 can occur. When magnetic coupling occurs, the transmitter of the wireless charger 110 should be able to detect communication packets (e.g., Qi packets) from the receiver of the mobile device 210 (step 250).

As discussed in some detail above, in some implementations, even where communication packets are detected, the electromagnet 140 may be driven solely due to the Hall effect sensor(s) of the wireless charger 110 detecting a magnet of the wearable device (such as device alignment magnet 212 of the mobile device 210). In such an implementation, Step 242 need not occur in order for the electromagnet 140 to be driven.

The disclosed system and related techniques provide a solution to the problem presented in attempting to charge both non-wearable mobile devices having a relatively large receiving coil and wearable mobile devices having a relatively small receiving coil. Due to the relatively small receiving coil of a wearable device and problems arising from the compact design of wearable devices (e.g., metal case of the wearable device being immediately around the receiving coil), it is necessary to accurately align the receiving coil of the wearable device with the transmission coil of the wireless charger. Therefore, even slight misalignment of the wearable device on the wireless charger could prevent the wearable device from being charged. A solution to this problem is provided by the disclosed system and the related techniques. In particular, the disclosed system and the related techniques provide a way to identify and/or detect a wearable device, and then reposition the wearable device so that it is accurately aligned with the transmission coil of the wireless charger.

The disclosed system and related techniques also avoid and/or reduce the problems that arise from alternative solutions. For example, an alternative solution to aligning a wearable device would be to replace the adaptive magnet with a permanent magnet. However, this would result in reduced charging efficiency for the wireless charging of both wearable and non-wearable devices. Having a permanent magnet in the wireless charger that dissipates energy from the power transmission coil could create additional heat during charging which would result in reduced charging efficiency. For example, having a permanent magnet in the wireless charger could interfere with the magnetic field created by the transmitting coil of the wireless charger. Due to this interference, more energy would be required in order to create the necessary magnetic field, and, thus, there would be reduced charging efficiency. A permanent magnet in the wireless charger also presents additional problems for some mobile devices, such as smartphones. It can interfere with the digital compass (magnetometer), camera autofocus, and/or optical image stabilization of mobile devices having such features. It can also magnetize some steel components within the mobile devices, which could make it much more difficult to calibrate certain features of the device, such as its digital compass (magnetometer). Finally, a permanent magnet in the wireless charger could not account for wearable devices having magnets with differing polarities. The disclosed system and related techniques reduce or avoid many of these issues by activating the adaptive magnet only when a wearable device is detected, and, in some implementations, reducing the driving current provided to the adaptive magnet or turning it off completely once the wearable device is accurately positioned. The disclosed system and related techniques can also account for wearable devices having magnets with differing polarities by dictating the direction of current driven through the adaptive magnet based on the detected polarity of the wearable device's magnet.

For the reasons mentioned above, it is not desirable to put a permanent magnet on certain non-wearable devices, such as smartphones. However, permanent magnets are useful for many wearable devices, such as smartwatches. The techniques in this document allow a single charger to effectively charge both types of devices, those having alignment magnets and those that do not. A significant part of this approach is detecting wearable devices having a permanent magnet, and then turning on the electromagnet 140 only after an appropriate type of device is detected. In some implementations, as discussed above, the detection of a device that does not use magnetic positioning will prevent the adaptive magnet from being activated.

By providing a wireless charger that works for both wearable and non-wearable mobile devices, the disclosed system and related techniques reduce the need for consumers to purchase multiple wireless chargers for different types of devices.

FIG. 3A shows an example cutaway diagram of the system 100 when the mobile device 210 is in a charging position with respect to the wireless charger 110.

Figure 3B:
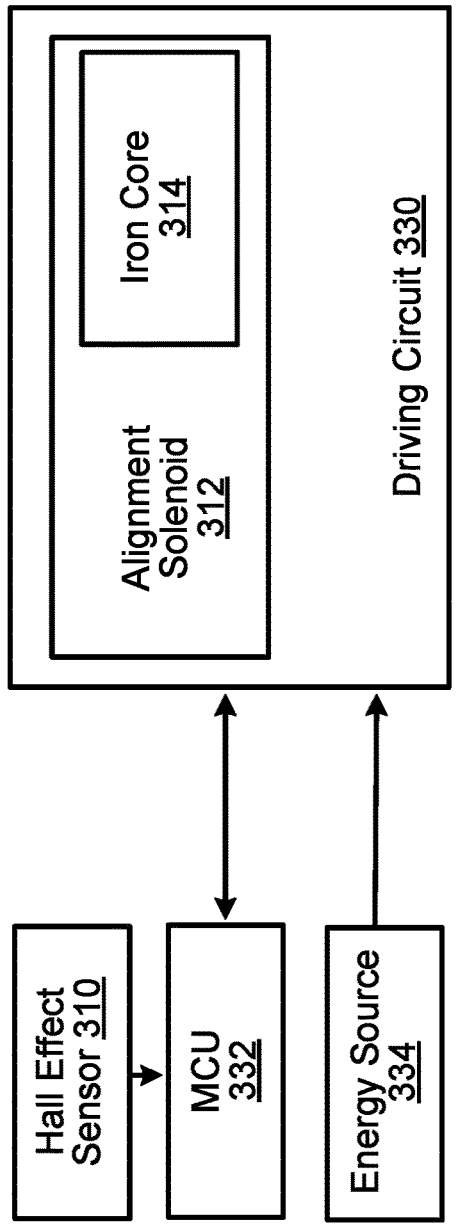
FIG. 3B is an example block diagram of various components of the system.

The wireless charger 110 can include a flat charging surface 112, a transmitter having MCU 332 (as shown in FIG. 3B) and a transmission coil 320, magnetic shielding 316, Hall effect sensor(s) 310, and a driving circuit 330 (as shown in FIG. 3B) having an alignment solenoid 312 with iron core 314. In the example of FIG. 3A, the electromagnet 140 (as shown in FIGS. 1-2) is a solenoid (i.e., alignment solenoid 312). The transmitter also includes a transmitter circuit (not shown) that converts the DC signal of the energy source 334 (as shown in FIG. 3B) into an AC signal that is then provided to the transmission coil 320.

The mobile device 210 can include a receiver having a receiving coil 322, magnetic shield 318, and a device alignment magnet 212. As explained above, the magnetic shield 318 of the mobile device 210 is positioned vertically above the receiving coil 322 when the mobile device 210 is placed on the wireless charger 110 in a charging orientation as shown. The magnetic shield 316 of the wireless charger 110 is positioned vertically below the transmission coil 320. The magnetic shields 316 and 318 improve the coupling between the transmitting and receiving coils, increase the efficiency of the inductive power transfer from the wireless charger 110 to the mobile device 210, and prevent unwanted leakage of the magnetic field.

FIG. 3B is an example block diagram depicting the connections between various components of system 100. The Hall effect sensor(s) is(are) coupled to the MCU 332, the MCU 332 is coupled to an energy source 334, the MCU 332 is coupled to the driving circuit 330, and the driving circuit 330 includes the alignment solenoid 312 having a core 314, e.g., a core formed of iron or other material that is not permanently magnetized. Here, as the device alignment magnet 212 of the mobile device 210 approaches the wireless charger 110 (e.g., permanent magnet comes within the magnet detection area 222 as discussed above with respect to FIGS. 2A-2B), the core 314 passes the magnetic field of the device alignment magnet 212 down to the Hall effect sensor(s) 310. The Hall effect sensor(s) 310 then provide(s) outputs to MCU 332 indicating that the device alignment magnet 212 is within proximity (i.e., it is within the magnet detection area) and a polarity of the device alignment magnet 212. The MCU 332 then provides output(s) to one or more transistors of the driving circuit 330 so as to enable current flow through the alignment solenoid 312.

In some implementations, the output of MCU 332 provided to the driving circuit 330 also determines a direction of current through the alignment solenoid 312. If the Hall effect sensor(s) 310 detect(s) that permanent magnet 212 has a south polarity, then the output of the MCU 332 provided to the driving circuit 330 will direct current through the alignment solenoid 312 in a first direction so as to create a north pole in order to attract the device alignment magnet 212. If the Hall effect sensor(s) 310 detect(s) that permanent magnet 212 has a north polarity, then the output of the MCU 332 provided to the driving circuit 330 will direct current through the alignment solenoid 312 in a second direction so as to create a south pole in order to attract the device alignment magnet 212.

In the example block diagram of FIG. 3B, the energy for the driving circuit 330 is provided by the energy source 334 that is directly coupled to the driving circuit 330 or is coupled to the driving circuit 330 through an additional circuit (not shown) that provides a current source for the driving circuit 330. In this example, the energy source 334 is the same energy source that powers the transmission coil 320 (as shown in FIG. 3A). In this example, the driving circuit 330 (and the additional circuit) are connected in parallel with the transmitter circuit. In other implementations, the driving circuit 330 may be placed in series with a portion of the transmitter circuit. These implementations would benefit from reduced manufacturing costs as there would be no need for an additional circuit to provide a current source for the driving circuit 330. In addition, these implementations would result in increased efficiency as energy loss would be reduced. In some implementations, the energy source 334 is externally provided (e.g., through an outlet) or is detachable from the wireless charger 110 (e.g., a detachable battery or capacitor). In other implementations, the energy source 334 may be internal to the wireless charger 110 (e.g., a battery or capacitor).

The one or more Hall effect sensors 310 of the wireless charger 110 may be threshold Hall effect sensors with unipolar functionality. For a unipolar Hall effect sensor, a single magnet presenting a first polarity (e.g., south polarity/positive) magnetic field of sufficient strength (magnetic flux density) will cause the sensor to switch to its on state. After it has been turned-on, the unipolar Hall effect sensor will remain turned-on until the magnetic field from the magnet is removed, at which point the unipolar Hall effect sensor will revert to its off state. The Hall effect sensor(s) 310 may have two outputs, such that a first output responds to flux of a negative (north polarity) magnetic field and a second output responds to flux of a positive (south polarity) magnetic field. It is also desirable that that Hall effect sensor(s) 310 have a higher sensitivity in order to drive the alignment solenoid as early as possible as this will create a better user experience.

The core 314 can be formed of an iron powder material, such as a carbonyl iron core, or a ferrite ceramic core, such as manganese-zinc ferrite or nickel-zinc ferrite. These materials may reduce eddy current losses. An iron powder core can be used for various magnetic flux and temperature levels, and can provide reduced eddy current losses at high temperatures when its grains are insulated. A ferrite ceramic core can also provide reduced eddy current losses due to having low electrical conductivity.

FIGS. 4A-C show example circuit diagrams of the driving circuit 330. As shown, the circuits each have a current source 410 and an alignment solenoid 312. In other embodiments, the driving circuit 330 is driven by a voltage source. The current source 410 may be provided by an additional circuit (not shown) as discussed above. In these implementations, current source 410 may be a variable current source. In these implementations, the additional circuit may be able to control the current intensity provided by current source 410, where current intensity is linear to the attraction force created by the alignment solenoid 312 on the permanent magnet of the device (e.g., permanent magnet 212 as shown in FIG. 2A and FIG. 3A). In other implementations, current source 410 is provided by connecting the driving circuit 330 in series with the transmitter circuit. In these implementations, current intensity can be provided by turning on and off certain transistors at a certain duty cycle, from 0%-100% (i.e., pulse-width modulation). This can be used to control the amount of average current flowing through the alignment solenoid 312 and, thus, controls the attraction force created by the alignment solenoid 312 on the permanent magnet of the device (e.g., permanent magnet 212 as shown in FIG. 2A and FIG. 3A). In some implementations, current source 410 can provide a current in the range of 1.0 mA-1.0 A through the alignment solenoid 312.

FIG. 4A shows an example circuit diagram of the driving circuit 330A that is able to drive current through alignment solenoid 312 in two directions. Here, driving circuit 330A contains a first transistor 412, a second transistor 414, a third transistor 416, and a fourth transistor 418. As shown, the transistors may be N-channel MOSFETs. Input to the gates of the MOSFET transistors 412-18 may be provided by the MCU 332 (as shown in FIG. 3B). When a permanent magnet having a first polarity is detected, transistors 412 and 418 are turned on (and transistors 414 and 416 may be left off, or turned on and off at a certain duty cycle) so that current runs through the alignment solenoid 312 in a first direction (i.e., forward driving). This creates a magnetic field that attracts the permanent magnet having a first polarity. When a permanent magnet having a second polarity is detected, transistors 414 and 416 are turned on (and transistors 412 and 418 may be left off, or turned on and off at a certain duty cycle) so that current runs through the alignment solenoid 312 in a second direction (i.e., backward driving). This creates a magnetic field that attracts the permanent magnet having a second polarity. In implementations where the current source 410 is provided by connecting the driving circuit 330 in series with the transmitter circuit, all transistors (i.e., transistors 412, 414, 416, and 418) can be turned on so that the alignment solenoid 312 is bypassed. In these implementations, all transistors are turned on when alignment solenoid 312 is not intended to be driven.

If the polarity of the permanent magnet of a device is known, the driving circuit 330 can use fewer transistors. The polarity of the permanent magnet may be known, for example, if an industry standard is created or adopted for devices with magnets, or certain devices with magnets (e.g., smartwatches).

FIG. 4B shows an example circuit diagram of the driving circuit 330B that is able to drive current through alignment solenoid in single direction. The example circuit diagram of FIG. 4B is limited to the implementations where current source 410 is provided by connecting the driving circuit 330B in series with the transmitter circuit. Here, driving circuit 330B contains a first transistor 420 and a second transistor 422. As shown, the transistors may be N-channel MOSFETs. Input to the gates of the MOSFET transistors 420 to 422 may be provided by the MCU 332 (as shown in FIG. 3B). When a permanent magnet is detected, transistor 422 is turned on (and transistor 420 is left off, or is turned on and off at a certain duty cycle) so that current is run through alignment solenoid 312. This creates a magnetic field that attracts the permanent magnet. In some implementations, MCU 332 (as shown in FIG. 3B) compares the detected polarity of the permanent magnet with the known polarity of the alignment solenoid 312 when current is run through it. If running current through the alignment solenoid 312 would not attract the permanent magnet due to the permanent magnet having the incorrect polarity, the MCU 332 (as shown in FIG. 3B) will not turn on transistor 422 but will instead turn on transistor 420 so that the alignment solenoid 312 is bypassed.

FIG. 4C shows an example circuit diagram of the driving circuit 330C that is able to drive current through alignment solenoid in single direction. The example circuit diagram of FIG. 4C is limited to the implementations where current source 410 is provided by connecting the driving circuit 330C in series with the transmitter circuit. Here, driving circuit 330C contains a single transistor 424. As shown, the transistor may be a N-channel MOSFET. Input to the gate of the MOSFET transistor 424 may be provided by the MCU 332 (as shown in FIG. 3B). With this circuit design, the alignment solenoid 312 cannot be completely bypassed. As such, there will always be some current passing through the alignment solenoid 312 and, thus, a magnetic field. Therefore, in order to effectively bypass the alignment solenoid 312, the drain-source on resistance ($R_{DS(on)}$) needs to be significantly lower than the DC resistance (DCR) of the alignment solenoid 312. When a permanent magnet is detected, transistor 424 is turned off (or is turned on and off at a certain duty cycle) so that the amount of current running through alignment solenoid 312 is substantially increased. This creates a significantly larger magnetic field that attracts the permanent magnet. In some implementations, the MCU 332 (as shown in FIG. 3B) compares the detected polarity of the permanent magnet with the known polarity of the alignment solenoid 312 with current running through it. If running additional current through the alignment solenoid 312 would not attract the permanent magnet due to the permanent magnet having the incorrect polarity, the MCU 332 (as shown in FIG. 3B) will turn on transistor 424 so that the alignment solenoid 312 is effectively bypassed.

FIGS. 4D-E show example circuit diagrams of a circuit 340 that includes driving circuit 330A (as shown in FIG. 4A) and the transmission coil 320. FIG. 4D shows an example circuit diagram of circuit 340A where the driving circuit 330A is connected in parallel with the transmission coil 320. FIG. 4E shows an example circuit diagram of circuit 340B where the driving circuit 330A is connected in series with the transmission coil 320.

Figure 5:
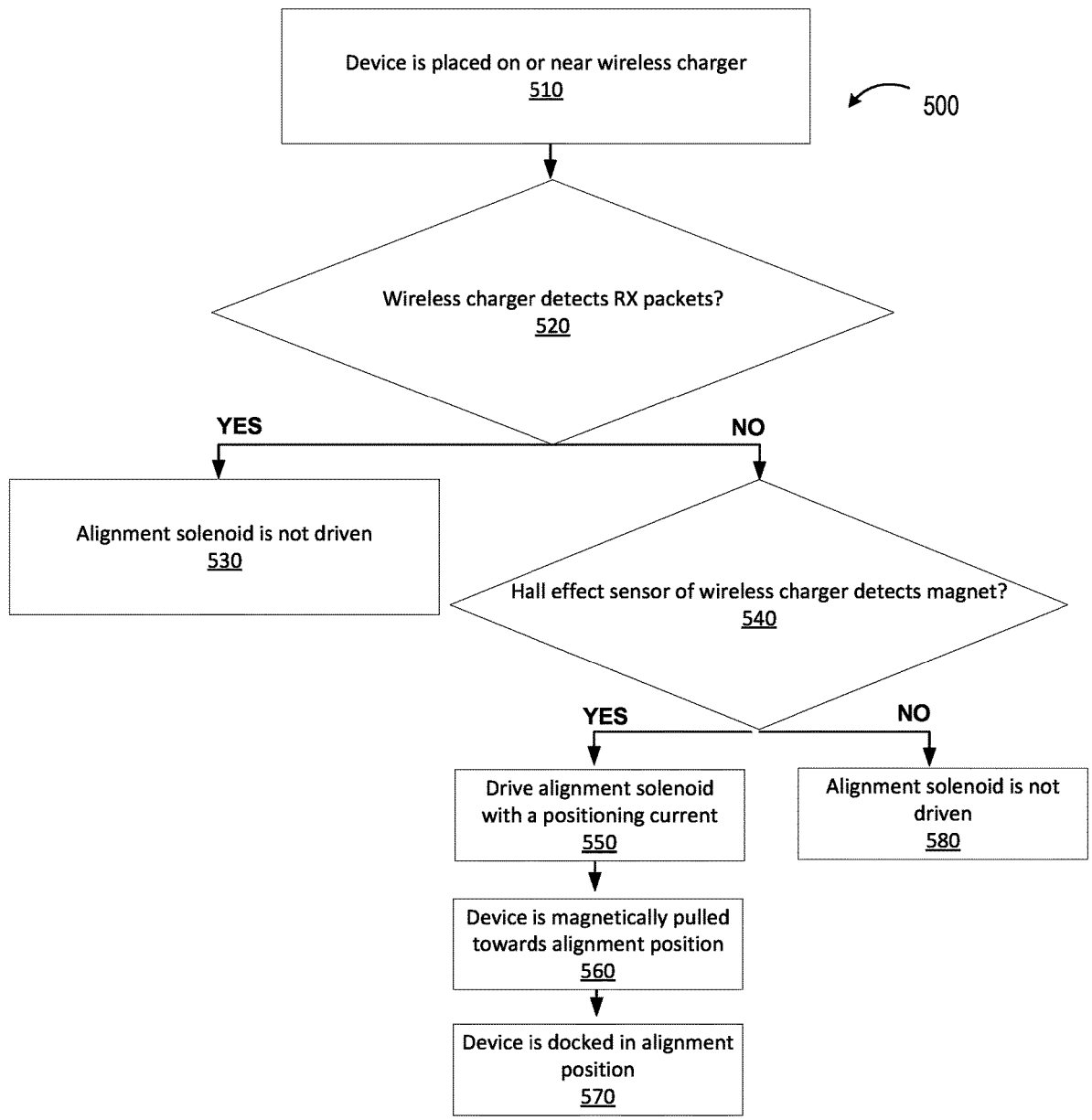
FIG. 5 is a flow diagram that illustrates an example process that a wireless charger may perform to determine whether to activate the adaptive magnet.

FIG. 5 shows an example process 500 for determining whether the alignment solenoid (such as alignment solenoid 312 as shown in FIGS. 3-4) is driven. The process can be performed, at least in part, using the system 100 described above.

In the process 500, a mobile device is placed on or near the wireless charger (step 510). The wireless charger may be wireless charger 110 (as shown in FIGS. 1-3). The mobile device may be a wearable device, such as mobile device 210 (as shown in FIGS. 2-3), or a non-wearable device, such as mobile device 120 (as shown in FIG. 1).

In the process 500, a determination is made as to whether the wireless charger detects communication packets from the receiver of the mobile device (step 520). In an example, the communication packets are Qi packets. In an example, the communication packets are signal strength packets that indicate sufficient signal strength between the receiver of the mobile device and the transmitter of the wireless charger for power transfer. In an example, the communication packets are rectified power packets which indicate that the overall coupling efficiency between the mobile device and the wireless charger has reached a threshold percentage (e.g., a percentage between and including 40%-90%).

In the process 500, if the determination in step 520 is yes, then the alignment solenoid is not driven (step 530). In an example, this means that no current is run through the alignment solenoid. In an example, this means that a relatively minute amount of current is run through the alignment solenoid when compared to the positioning current (see FIG. 4C)

In the process 500, if the determination in step 520 is no, then a second determination is made as to whether the Hall effect sensor(s) of the wireless charger detects a permanent magnet (step 540). The Hall effect sensor(s) may be Hall effect sensor(s) 310 (as shown in FIG. 3). In an example, the Hall effect sensor(s) may have two outputs, such that a first output responds to flux of a negative (north polarity) magnetic field and a second output responds to flux of a positive (south polarity) magnetic field.

In the process 500, if the determination in step 540 is yes, then the alignment solenoid is driven with a positioning current (step 550). A determination of yes here indicates that the mobile device is a wearable device with a magnet, such as mobile device 210 (as shown in FIGS. 2-3). The positioning current may be the current provided by the current source 410 (as shown in FIG. 4). In an example, the positioning current may be between and including 1.0 mA-1.0 A.

The mobile device is then magnetically pulled towards an alignment position on the wireless charger (step 560). Alignment position may be alignment position 220 (as shown in FIG. 2).

The mobile device is then docked at the alignment position (step 570). Once docked, the mobile device is able can be magnetically coupled to the wireless charger, and, thus, wireless power transfer can begin. Once wireless power transfer begins, communication packets from the receiver can be transferred to the wireless charger.

In the process 500, if the determination in step 540 is no, then the alignment solenoid is not driven (step 580). In an example, this means that no current is run through the alignment solenoid. In an example, this means that a relatively minute amount of current is run through the alignment solenoid when compared to the positioning current (see FIG. 4C)

FIGS. 6A-C show variations of an example process 600 for what happens after the wearable device with a magnet has been docked in the alignment position.

In process 600 of FIG. 6A-C, the wearable device with a permanent magnet is docked in the alignment position of the wireless charger (step 610). The wireless charger may be wireless charger 110 (as shown in FIGS. 1-3). The wearable device may be a mobile device 210 (as shown in FIGS. 2-3). The permanent magnet may be device alignment magnet 212 (as shown in FIGS. 2-3).

In process 600 of FIG. 6A, the alignment solenoid continues to be driven with the positioning current (step 620). This would maintain the highest amount of force between the wearable device and the wireless charger, and, thus, would keep the wearable device strongly secured to the wireless charger at the alignment position. The positioning current may be the current provided by the current source 410 (as shown in FIG. 4). In an example, the positioning current may be between and including 1.0 mA-1.0 A.

In the process 600 of FIG. 6B, the alignment solenoid continues to be driven but with a current less than that of the positioning current (step 630). This would provide a smaller amount of force between the wearable device and the wireless charger than that provided in step 620, but would provide enough force for the alignment position to be maintained. When compared with step 620, step 630 does a better job of reducing and/or avoiding the problems that a permanent magnet in the wireless charger would cause as discussed above. In an example, the current through the alignment solenoid is one-third of the positioning current. In an example, the current through the alignment solenoid is one-fourth of the positioning current.

In the process 600 of FIG. 6C, the alignment solenoid is no longer driven (step 640). In an example, this means that no current is run through the alignment solenoid. In an example, this means that a relatively minute amount of current is run through the alignment solenoid when compared to the positioning current (see FIG. 4C). The force between the wearable device and the wireless charger would be provided by the attraction between the permanent magnet of the wearable device and the iron core of the wireless charger. This would provide a smaller amount of force between the wearable device and the wireless charger than that provided in step 620 and step 630, but would provide enough force for the alignment position to be maintained. When compared with step 620 and step 630, step 640 does a better job of reducing and/or avoiding the problems that a permanent magnet in the wireless charger would cause as discussed above. This step would also eliminate the steady state power consumption.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodi-

What is claimed is:

1. A wireless charger comprising:
   a power transmission coil configured to wirelessly provide power at a charging area of the wireless charger through inductive coupling;
   a magnetic sensor arranged to detect whether a magnet is present at the charging area;
   an electromagnet configured to generate a magnetic field in the charging area when the electromagnet is energized to align a mobile device to be charged by the power transmission coil; and
   control circuitry configured to:
   (i) selectively energize the electromagnet to align the mobile device, based on receiving a signal from the magnetic sensor indicating that a magnet is present at the charging area;
   (ii) detect wireless communication from the mobile device while the electromagnet remains energized; and
   (iii) terminate or decrease power to the electromagnet based on having detected the wireless communication from the mobile device.

2. The wireless charger of claim 1, wherein the magnetic sensor is a Hall effect sensor.

3. The wireless charger of claim 1, wherein the electromagnet is a solenoid.

4. The wireless charger of claim 3, wherein the solenoid has a core formed of iron, ferrite, or a powdered iron material.

5. The wireless charger of claim 3, wherein the charging area is a substantially planar surface of the wireless charger,
   wherein solenoid has a core that extends along an axis, the axis being oriented substantially perpendicular to the substantially planar surface, the solenoid having one or more coils that extend around the core about the axis.

6. The wireless charger of claim 1, wherein the control circuitry is configured to maintain the electromagnet deactivated when a device of a first device type is placed in the charging area; and
   wherein the control circuitry is configured to activate the electromagnet when a device of a second device type of placed in the charging area.

7. The wireless charger of claim 6, wherein the first device type is a mobile phone device type, and the second device type is a watch device type.

8. The wireless charger of claim 1, wherein the control circuitry is configured to determine, upon placement of a device in the charging area, whether the device is one of multiple device types; and
   wherein the control circuitry is configured to selectively activate the electromagnet depending on the device type determined for the device.

9. The wireless charger of claim 1, wherein the electromagnet is located along the charging area and configured to attract, when energized, a magnet of a device on the charging area, the control circuitry being configured to initiate activation of the electromagnet in response to detecting the magnet of the device using the magnetic sensor.

10. The wireless charger of claim 1, wherein the electromagnet has a core, and the magnetic sensor is located adjacent to the core of the electromagnet such that the magnetic sensor is configured to sense magnetic fields transmitted through the core of the electromagnet.

11. The wireless charger of claim 1, wherein the charging area comprises a substantially planar external surface of the wireless charger configured to support a device during charging of the device;
    wherein the magnetic sensor is a Hall effect sensor;
    wherein the electromagnet is a solenoid, the solenoid having a core extending along an axis from a first end of the core to a second end of the core; and
    wherein the core of the solenoid is arranged such that the axis is substantially perpendicular to the substantially planar external surface, the first end of the core facing the substantially planar external surface, and the Hall effect sensor being disposed at the second end of the core.

12. The wireless charger of claim 1, wherein the control circuitry is configured to determine a device type for a device located at the charging area based on wireless communication with the device; and
    wherein the control circuitry is configured to selectively energize the electromagnet based on the device type determined through wireless communication with the device.

13. The wireless charger of claim 1, wherein the magnetic sensor is configured to detect a polarity of a magnet of a device placed on the charging area; and
    wherein the control circuitry configured to energize the electromagnet with a polarity opposite the detected polarity of the magnet of the device, such that the energized electromagnet attracts the magnet of the device toward an alignment position for charging the device with the wireless charger.

14. A method to align a mobile device at a wireless charger, comprising:
    receiving, by the wireless charger, a signal from a magnetic sensor indicating that a magnet of the mobile device is present at a charging area of the wireless charger;
    energizing, by the wireless charger, an electromagnet of the wireless charger to align the mobile device to be charged by a power transmission coil of the wireless charger that is configured to wirelessly provide power to the mobile device through inductive coupling, based on having received the signal from the magnetic sensor indicating that the magnet of the mobile device is present at the charging area;
    detecting, by the wireless charger, wireless communication from the mobile device while the electromagnet remains energized; and
    terminating or decreasing power to the electromagnet, by the wireless charger, based on having detected the wireless communication from the mobile device.

15. The wireless charger of claim 1, wherein the wireless communication is detected using the power transmission coil.

16. The wireless charger of claim 1, wherein the wireless communication is provided by inductive coupling between a power receiving coil of the mobile device and the power transmission coil of the wireless charger.

17. The wireless charger of claim 1, wherein the control circuitry is configured to selectively energize the electromagnet based on receiving the signal from the magnetic sensor indicating that a magnet is present at the charging area while detecting no wireless communication or inadequate wireless communication from the mobile device.

* * * * *